Oct. 28, 1941.　　　　　M. EGUCHI　　　　2,260,705
FISHERMAN'S LIVE BAIT CASTING CARTRIDGE
Filed Jan. 18, 1941
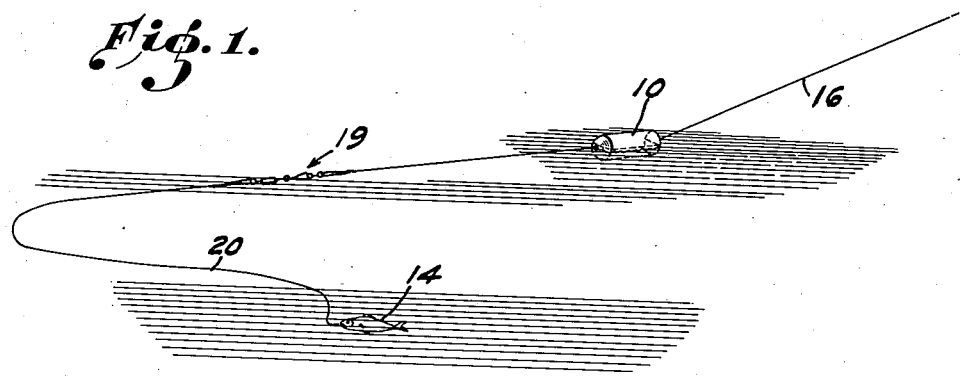
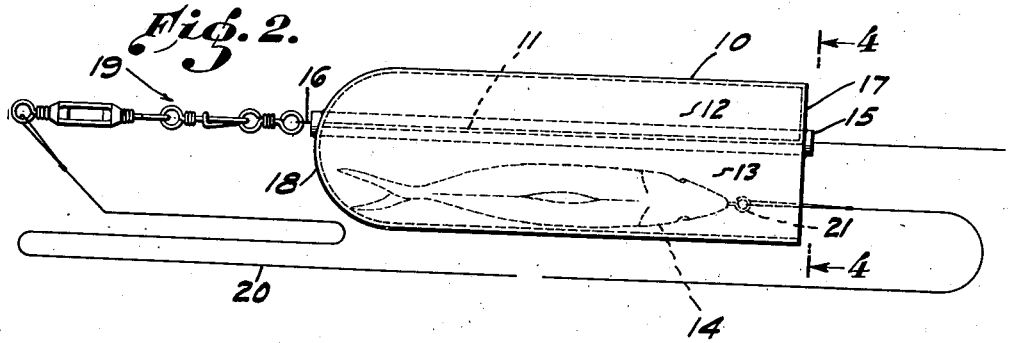
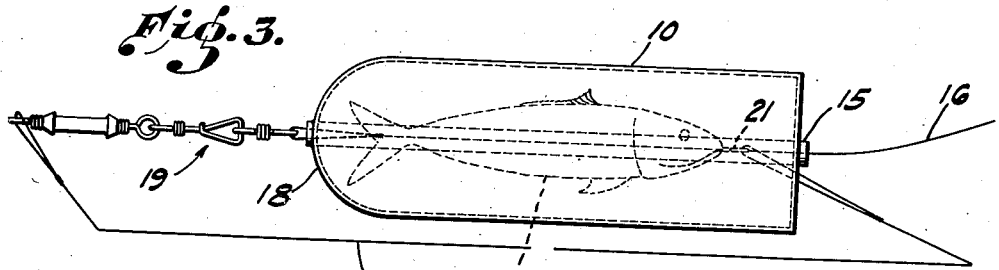
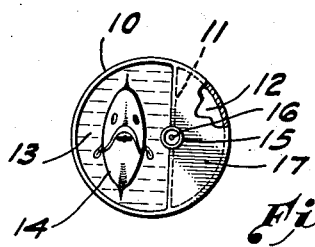
MITSUO EGUCHI,
INVENTOR.
BY
ATTORNEY.

Patented Oct. 28, 1941

2,260,705

UNITED STATES PATENT OFFICE 2,260,705

FISHERMAN'S LIVE BAIT CASTING CARTRIDGE

Mitsuo Eguchi, Los Angeles, Calif.

Application January 18, 1941, Serial No. 375,031

9 Claims. (Cl. 43—41)

The present invention relates to a flotatable capsulary cartridge for releasably supporting a live bait to be cast by a fisherman into a body of water in which the live bait is permitted to swim as a lure for attracting larger fish sought to be captured.

One of the important objects of the invention is to provide a buoyant capsulary casting cartridge freely movable on a fish line and having a liquid containing compartment furnished with an exit opening for releasing a live bait, from which the bait is permitted to swim after the cartridge is cast by a fisherman through the medium of said line into a body of water.

An additional important object of the invention is to provide a buoyant liquid containing device for releasably supporting a live bait, which is rendered more safe in its operation by reason of the fact that it is free from exterior dangling hooks ordinarily used for snagging fish or for supporting live bait.

Still another object of the invention is to provide a partition wall forming one of the sides of an air compartment constructed alongside of the liquid containing compartment through which extends a passage into which the fish line is slidably mounted to maintain the device in a liquid receiving and casting position.

A more specific object of the invention is to provide a casting cartridge from which a live bait is releasable to swim after the same is cast into a body of water, said bait being attached to a leader swivelly attached to a fish line, the leader being extendable through the cartridge to maintain the latter afloat at a distance from which the bait swims, the leader under the influence of the initial submerging of the cartridge in the water tending to pull on the hook to which the bait is attached, thereby influencing the departure of the bait therefrom.

Still further specific objects of the invention pertain to a device which will enable fishermen to: (a) safely cast a baited hook and line from a crowded surrounding; (b) cast greater distances without injury of shock to a living bait; (c) combine weight or sinker of desired weight and a float of desired buoyancy; (d) use a longer leader line without the danger of becoming entangled with surrounding obstacles, and (e) prevent loss of bait from hook due to impact thereof with the water.

With the foregoing and other objects in view, the invention resides in the novel combination of parts and in the details of construction hereinafter described and claimed, it being understood that changes in the precise embodiment of the invention herein disclosed may be made within the scope of that which is claimed without departing from the spirit of the invention.

Referring to the accompanying drawing, which illustrates what is at present deemed to be a preferred embodiment of the invention, Fig. 1 is a perspective view of the submergible portion of a fisherman's line showing the same equipped with the invention. In this view the live bait has escaped from the container provided therefor, and serves to attract the larger fish being sought.

Fig. 2 is a side elevation of the cartridge or container for the live bait which is shown therein outlined in its concealed position.

Fig. 3 is a bottom plan view of the structure shown in Fig. 2.

Fig. 4 is an end elevation viewing the device from the plane indicated by the line 4—4 in Fig. 2, in the direction indicated by the arrows. In this view a fragment of the end wall of the cartridge is broken away adjacent to the periphery thereof in order to disclose its construction more clearly.

Referring in detail to the drawing, the live-bait containing member 10, by preference and as shown, consists of an elongated, cartridge-like container having a partition plate 11 extending longitudinally through it, thereby separating it into an upper (when floating upon the water) compartment 12 which contains enough air to insure that it will not sink; and a larger lower compartment 13 to contain the live bait shown as a small fish 14.

Through the cartridge 10 from end to end thereof, extends a small tube 15 which is open at each end and the passage through which is sufficiently restricted in size to have a diameter only sufficiently large for the convenient insertion through the tube of the fish line 16. Said tube is shown molded into or cast as a part of the partition 11 and as projecting only slightly beyond the segmental flat wall 17 which closes the otherwise open end of the cartridge. At its opposite closed end the cartridge is furnished with a more or less tapered closure means, shown in the drawing as a convex wall 18, beyond which also the tube 15 slightly projects.

As shown in Figs. 2 and 3, adjacent to the ogival or convex end of the cartridge, the line 16 has attached to it one end of a conventional swivel connection 19. The opposite end of said connection having secured to it the terminal section 20 of the line, which, in turn, carries at its other extremity a hook 21 by which the live bait 14 is tethered to the cartridge.

An advantage is obtained by locating the tube 15 in the partition plate 11, and at the same time constructing said tube with its end portions projecting slightly from the aft wall 17 and the convex fore wall 18, in that the device as a whole is thus strengthened and stabilized and the stress thereupon is applied in the safest possible manner, when by reason of traction upon the line 16 the swivel connection 19 is caused to abut against the fore end of the tube 15.

Although the tube 15 is of a restricted internal diameter, yet it has a sufficient lumen to allow the line 16 to play freely therethrough, so that the live bait, after it escapes from the compartment provided for it, can swim freely about in the water and in doing so can withdraw that end portion of the line 16 which is attached to the swivel connection 19, a considerable distance from the cartridge 10, as well illustrated in Fig. 1.

In the operation of the device, the fisherman, having secured the live bait 14 to the line section 20 by means of the hook 21, will allow the fish being used as the bait to remain in water held in a suitable container until he desires to perform a casting operation. Then, while holding the cartridge with its upper end uppermost, he will fill the bait compartment 13 thereof with water and will insert the live fish to be used as bait thereinto, with the head of the fish directed toward the open end of the cartridge. Thereupon, with the swivel connection abutting against the fore end of the cartridge he will give it a vigorous swinging movement and will thereby cast it into the water. As it strikes the water its ogival or tapered end will offer but a slight resistance to the entrance thereof into the water, thereby reducing the shock to which the live bait is subjected. Also, as the cartridge enters the water more or less traction will, as a result, be applied to the line section 20, thus tending to pull the fish which is being used as bait out of the compartment 13.

Owing to the compact way in which the live bait is combined with the cartridge, the fisherman may swing the device forth from a boat, pier, or other location from which he is fishing with less danger of interfering with the operation of fellow fishermen or with entangling his line with adjacent persons or objects.

Danger of entanglement or outside interference with his fishing operation is further minimized by reason of the only hook used being imbedded within the live bait, there being no additional hooks carried by or distributed along the line with which he is fishing.

What is claimed is:

1. In a fisherman's implement, a capsulary casting cartridge for containing a liquid for releasably supporting a live bait to swim freely from the cartridge after the same has been cast into a body of water, said cartridge having a transverse wall closing a segment of the open end thereof, there being an enclosed passageway extending longitudinally through said cartridge, a fish line including a leader extensibly mounted in said passageway, and means restricting the pulling of said leader through said passageway by the fisherman.

2. In a fisherman's implement, a capsulary casting cartridge for supporting live bait to be released upon contact of said cartridge with a body of water, there being an enclosed passageway extending longitudinally through said cartridge, a fish line extending freely through said passageway, a leader fastened to said line to which the live bait is attached, and means restricting the pull of said leader through said passageway.

3. In a fisherman's implement, a capsulary casting cartridge or body for detachably releasing live bait in a body of water after the cartridge is cast, comprising a liquid containing compartment containing live bait, transverse walls forming an air chamber alongside said compartment for maintaining the cartridge afloat after the live bait swims therefrom, a longitudinal passageway extending through one of the transverse walls of the cartridge, a fish line extending through said passageway, a leader line swivelly fastened to said fish line including a hook fastened to the bait, said leader line together with its swivel and said fish line being free for extension from said cartridge into the body of water by the swimming action of the live bait in the water after the bait swims from said compartment in said cartridge.

4. In a fisherman's implement, an elongated cartridge having through it a longitudinal partition whereby an air containing enclosed compartment is provided on one side of said partition to afford buoyancy to the cartridge and a space is provided at the opposite side of said partition to contain water for sustaining the life of live bait, there being a passage of restricted diameter provided along the mid-width portion of said partition from end to end of the cartridge, a fish line passing through said passage and freely movable therein, a portion of said line projecting beyond said passage, a swivel connection one end of which is secured to the portion of said fish line which projects beyond said passage, a leader line secured to the opposite end of said swivel connection, and a hook carried by said leader line to connect it with live bait insertable within the aforesaid water space of the cartridge.

5. In a fisherman's implement, a capsulary casting cartridge for containing a liquid for releasably supporting a live bait to swim freely from the cartridge after the same has been cast into a body of water, said cartridge having a transverse wall closing a segment of the open end thereof, there being an enclosed passageway extending longitudinally through said cartridge, a fish line including a leader extensibly mounted in said passageway, and means restricting the pulling of said leader through said passageway by the fisherman, a portion of said passageway which extends through the mouth of the cartridge being integralized with said transverse wall.

6. In a fisherman's implement, a capsulary cartridge for supporting live bait to be released upon contact of said cartridge with a body of water, there being an enclosed passageway extending longitudinally through said cartridge, a fish line extending freely through said passageway, a leader fastened to said line to which the live bait is attached, and means restricting the pull of said leader through said passageway, there being a dividing partition separating said cartridge into two compartments, said passageway being formed in said dividing partition.

7. A fish lure comprising an elongated member having a longitudinally extending walled in compartment to contain water and a live fish bait and a buoyancy chamber paralleling said compartment, said compartment having an exit opening for the fish, and a leader line whereby the live bait is extensibly tethered to said member, said member having a longitudinally extending passage through it formed in the wall enclosing said compartment, said line being fastened to a swivel, and said swivel in turn being fastened to a portion of the main fishing line extending through said passage, said swivel restricting the pull of said leader through said passage.

8. In a fisherman's implement, an elongated cartridge having through it a longitudinal partition wall whereby an air containing enclosed compartment is provided on one side of said partition to afford buoyancy to the cartridge and a space is provided at the opposite side of said partition to contain water for sustaining the life of live bait, there being a passage of restricted diameter extending longitudinally from end to end of the cartridge, said passage being formed in one of the walls of said cartridge, a fish line passing through said passage and freely movable therein, a portion of said line projecting beyond said passage, a swivel connection one end of which is secured to the portion of said fish line which projects beyond said passage, a leader line secured to the opposite end of said swivel connection, and a hook carried by said leader line to connect it with live bait insertable within the aforesaid water space of the cartridge.

9. A fisherman's live bait casting cartridge comprising a tube having a closed convex end wall forming a receptacle for water and a live bait, there being within said tube a longitudinally extending buoyancy chamber occupying a segment thereof, there also being a longitudinally extending passageway of restricted diameter in one of the walls of said tube, one end of said passageway terminating adjacent the end wall forming said convexity, a fish line passing through said passageway and freely movable therein, means extensibly fastened to the portion of the line projecting beyond said convexity whereby thru the medium of the line passing through said passageway to vertically suspend said cartridge preparatory to casting, and a leader line including a hook to which the live bait is fastened, secured to said means.

MITSUO EGUCHI.